June 3, 1947.  P. M. ELLIOTT  2,421,375
CRUDE OIL SEPARATOR
Filed Nov. 16, 1943
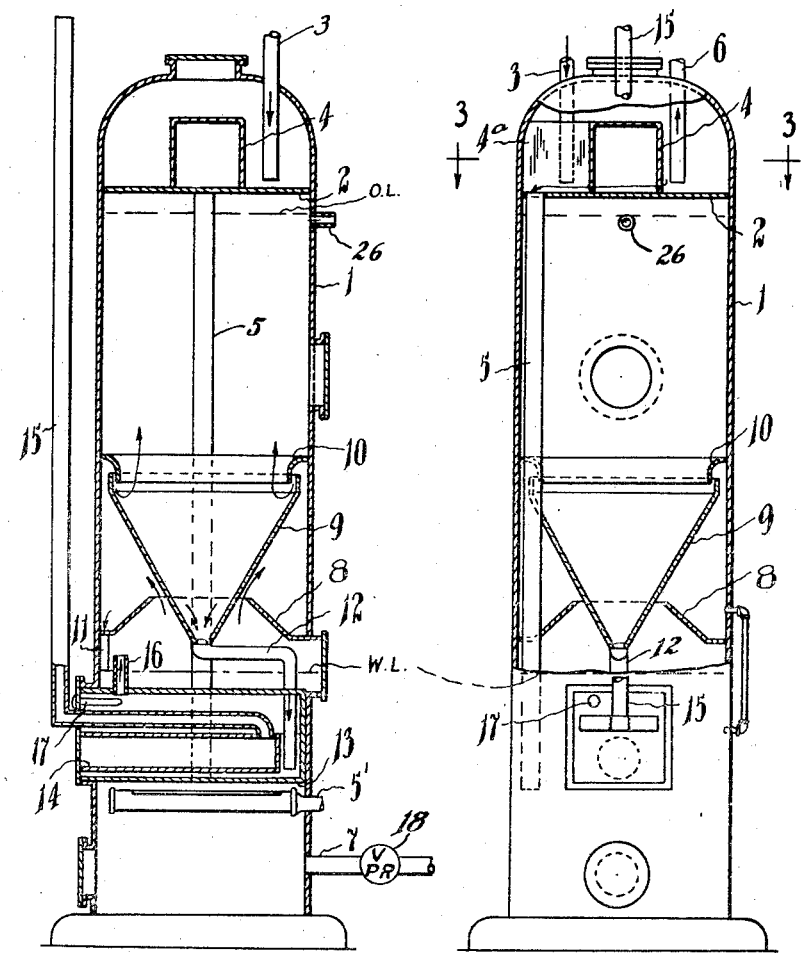
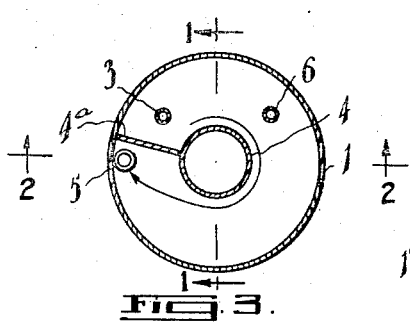
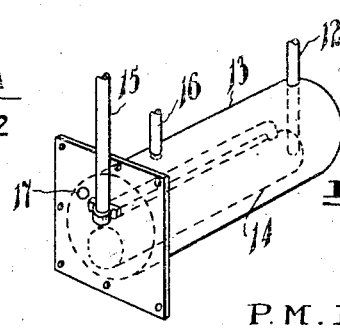
Inventor
P. M. Elliott
by Gareth E. Maybee
ATTY Patented June 3, 1947

2,421,375

UNITED STATES PATENT OFFICE 2,421,375

CRUDE OIL SEPARATOR

Peter Mather Elliott, Toronto, Ontario, Canada, assignor to Oil Distribution Appliances Limited, Toronto, Ontario, Canada Application November 16, 1943, Serial No. 510,520

6 Claims. (Cl. 210—52.5)

This invention relates to separators for crude oil, particularly to the type of separator in which the crude oil is passed through a tank where means are provided for carrying off any gas that may be mixed with the liquid, and for scrubbing the liquid to separate the water from the oil. According to the present invention the mixture of oil and water is passed through specially constructed baffles which separate the oil from the water. Partially separated liquid is subjected to heat and again passed through the baffle system where the remainder of the oil is separated from the water.

The invention is hereinafter more particularly described and is illustrated in the accompanying drawings in which Figure 1 is a vertical section viewed from one side of the device;

Figure 2 a front view partly broken away;

Figure 3 a cross section on the line 3—3 in Figure 2; and

Figure 4 a perspective view of the heating unit.

In the various figures corresponding numerals refer to corresponding parts.

The tank 1 is cylindrical in form and contained within said tank is the separating apparatus hereinafter described. The tank is divided adjacent the top thereof by means of a partition 2 to form a chamber in the upper part of the tank. Into this chamber through an inlet pipe 3 passes the oil-water-gas mixture from the oil well, which flows around an annular baffle 4 and down the pipe 5 to a point adjacent the bottom of the tank. A transverse baffle 4ª extending between the outer wall of the tank and the annular baffle 4 forces the liquid to travel around the annular baffle 4 as illustrated by the arrows in Figures 2 and 3. In the course of passage around the baffle, gas which is mixed with the oil passes off and out through the outlet pipe 6 in the top of the tank.

If there is no appreciable amount of gas mixed with the liquid, the liquid may be passed directly into the bottom of the tank from the pipe 5' which as will be seen from Figure 1 extends across the bottom of the tank and is provided with a longitudinal slot through which the liquid mixture will pass into the tank.

The oil and water mixture which has entered the tank through the pipe 5 or 5' then will pass up through the tank and out through the outlet pipe 26 where it is carried away for further treatment.

It will be understood that the tank will be full of oil and water, the oil level being adjacent the outlet at substantially the point marked O. L., and the water level being at substantially the point marked W. L. in Figures 1 and 2. There will be a certain fusion of oil and water throughout the height of the tank. The approximate line of division between the water and oil, marked as the water line, will be regulated in a known manner by a pressure valve 18 in pipe 7 adjacent the bottom of the tank, and which permits the water to flow out when a predetermined weight of water is in the separator. Conventional means for regulating amount of water in the tank are shown in such prior patents as Ihrig 2,232,948 or Walker 2,181,687.

The water and oil mixture which has come into the tank through the pipe 5 or the pipe 5' passes up through the tank and will be directed by the annular upwardly sloping baffle 8, which is secured to the walls of the tank 1 and surrounds the apex of the inverted cone 9, against the outer walls of said inverted cone 9. The oil-water mixture travels up the sides of the inverted cone 9 to the top thereof, where the said mixture is trapped by a ring 10 which is secured to the walls of the tank 1 and extends over the upper rim of the inverted cone and down within the cone slightly below the said rim. This reverse flow is very effective as a separator. Subsequently the oil, from which most of the water has been removed by passing through the baffle system above described, will pass up and out through the outlet 26. For final separation, further baffles may be arranged within the tower or tank 1.

Water which has separated out while passing up the sides of the inverted cone 9 will be caught between the baffle 8 and the walls of the tank 1, and as shown in Figure 1 a drain pipe 11 is provided in the bottom of the baffle 8. The water being heavier than the oil will flow down through this drain pipe. Likewise, a drain 12 is provided for water which is separated out by the ring 10 and which sinks to the bottom of the inverted cone 9. Mixed with this water will be considerable oil. This mixture is carried by means of the pipe 12 to the bottom of the jacket 13 which surrounds the heating unit 14 which is an oil burner of a known type and which is provided with a smoke stack or fume vent 15 which runs up outside the front of the tank. In this jacket 13 the water which is still mixed with some oil is warmed to a temperature of 100° to 170° and passes out of the pipe 16 into the tank below the inverted cone 9. A thermostat 17 is provided in the jacket 13 for regulating the temperature of the mixture. Raising the temperature of the mixture of water and oil in the jacket 13 causes complete and final separation so that the mixture which comes up through the pipe 16 separates out, the separated oil going upwardly through the separator to the oil outlet, and the water 12 being discharged in the manner hereinbefore described.

The efficient construction of the scrubbers or separators makes it possible to reduce the height of separator required to separate any given quantity of oil and water, and heating only a portion of the fuel which cannot be separated by scrubbing, effects a considerable saving in the fuel. Separation of a certain proportion of oil and water can be carried out quickly and efficiently without the use of heat, but after such initial separation, water still clings to some particles of oil, and further separation can only be satisfactorily and efficiently effected by heating the mixture, as is done in accordance with this invention. Heating only a small portion of the mixture effects not only a saving of fuel, but also a saving of time, since the time within which the oil can be passed through a separator of a given size depends largely on the length of time it takes to heat the mixture. Obviously if only a small part of the mixture requires to be heated it can be passed through the separator much more quickly so that, for instance, a separator of a size which has a capacity of 100 barrels of oil per day might be capable of handling 500 barrels a day if made according to this invention.

It is thought that the construction and use of the invention will be apparent from the above description of the various parts and their purpose. It is to be understood that the form of my invention herewith shown and described, is to be taken as a preferred example of the same, and that various changes in the shape, size and arrangement of parts may be resorted to, without departing from the spirit of my invention, or the scope of the subjoined claims.

What I claim as my invention is:

1. A separator for crude oil, comprising a tank having an inlet for the crude oil with which water is mixed, a heater in the tank, a chamber in which the heater is located, means in the tank above the chamber for separating oil from water, the said crude oil inlet being located below the separating means, a drain pipe for carrying imperfectly separated oil and water from the separating means to the chamber at a point adjacent the bottom thereof, and means for carrying heated oil and water from the top of the chamber to the separating means, an outlet from the tank above the separating means for carrying off the separated oil, and an outlet from the tank below the separating means for carrying off the separated water.

2. A separator for crude oil, comprising a tank having an inlet for the crude oil with which water is mixed, a heater in the tank, a chamber in which the heater is located, means in the tank above the chamber for separating oil from water, said means being located above the crude oil inlet and including an inverted cone, a drain pipe from the apex of the cone to the chamber for carrying imperfectly separated oil and water from the cone, and means for discharging heated oil and water from the chamber at a point below the separating cone, an outlet from the tank above the separating means for carrying off the separated oil, and an outlet from the tank below the separating means for carrying off the separated water.

3. A separator for crude oil, comprising a tank, and means for separating oil from water including an inverted cone having its rim adjacent to but spaced from the sides of the tank, a ring secured to the sides of the tank and extending over and spaced from the upper rim of the cone, an annular baffle secured to the sides of the tank and surrounding the lower end of the cone and extending upwardly and inwardly to a point adjacent but spaced from the sides of the inverted cone, a drain from the space between the sides of the tank and the baffle in the interior of the tank below the baffle, a drain from the apex of the cone to the interior of the tank below the cone, an inlet into the tank below the separating means, an oil outlet above the separating means, and means for removing separated liquid from below the separating means.

4. A separator constructed as set forth in claim 3 in which a chamber is located within the tank below the separating means, a heater is located in the chamber, the drain for the cone communicates with the chamber, and the chamber is provided with an outlet below the ring but above the drain from the space between said ring and the walls of the tank.

5. A separator for crude oil, comprising a tank, and means for separating oil from water including an inverted cone having its rim adjacent to but spaced from the sides of the tank, a ring secured to the sides of the tank and extending over and spaced from the upper rim of the cone and down within the cone below the said rim, a drain in the bottom of the cone for carrying off imperfectly separated oil and water from the cone to the interior of the tank below the cone, an inlet into the tank below the cone, means for heating said imperfectly separated oil and water, said heating means being located below the cone, an oil outlet from the tank above the separating means, and means for removing water from below the separating means.

6. A separator for crude oil, comprising a tank, and means for separating oil from water including an inverted cone having its rim adjacent to but spaced from the sides of the tank, a ring secured to the sides of the tank and extending over and spaced from the upper rim of the cone and down within the cone below the said rim, an annular baffle secured to the sides of the tank and surrounding the lower end of the cone and extending upwardly and inwardly to a point adjacent but spaced from the sides of the inverted cone, a drain from the space between the sides of the tank and the baffle to the interior of the tank below the baffle, a drain in the bottom of the cone for carrying off imperfectly separated oil and water from the cone to the interior of the tank below the baffle, an inlet into the tank below the cone, an oil outlet from the tank above the separating means, and means for removing water from below the separating means.

PETER MATHER ELLIOTT.

REFERENCES CITED

The following references are of record in the file of this patent:

UNITED STATES PATENTS

| Number | Name | Date |
| --- | --- | --- |
| 1,585,979 | Harrison | May 25, 1926 |
| 1,633,195 | Schwab et al. | June 21, 1927 |
| 946,759 | King | Jan. 18, 1910 |
| 1,523,077 | Melott | Jan. 13, 1925 |
| 2,179,131 | Millard | Nov. 7, 1939 |
| 1,943,367 | Champion | Jan. 16, 1934 |
| 2,181,685 | Walker | Nov. 28, 1939 |
| 1,357,101 | LeVora | Oct. 26, 1920 |
| 2,230,386 | Pecker | Feb. 4, 1941 |
| 1,803,083 | Wack | Apr. 28, 1931 |
| 2,261,101 | Erwin | Oct. 28, 1941 |
| 2,181,684 | Walker | Nov. 28, 1939 |
| 2,181,687 | Walker | Nov. 28, 1939 |
| 2,185,177 | Bates | Jan. 2, 1940 |